(12) United States Patent
Sheffler et al.

(10) Patent No.: US 7,144,205 B2
(45) Date of Patent: Dec. 5, 2006

(54) INSERT RETENTION SCREW AND TOOL BODY AND INSERT THEREWITH

(75) Inventors: Glenn W. Sheffler, Blairsville, PA (US); Jeffrey F. Kovac, Latrobe, PA (US); Kevin M. Gamble, Stahlstown, PA (US); Karen A. Craig, Ligonier, PA (US)

(73) Assignee: Kennametal Inc., Latrobe, PA (US)

( * ) Notice: Subject to any disclaimer, the term of this patent is extended or adjusted under 35 U.S.C. 154(b) by 122 days.

(21) Appl. No.: 10/435,062

(22) Filed: May 9, 2003

(65) Prior Publication Data

US 2004/0223819 A1 Nov. 11, 2004

(51) Int. Cl.
B23C 5/20 (2006.01)
B23C 5/22 (2006.01)

(52) U.S. Cl. .................. 407/103; 407/104; 407/113; 407/48; 408/713

(58) Field of Classification Search ............... 407/40, 407/42, 48, 53, 61, 62, 103, 104, 113; 408/713; 411/537, 538; B23C 5/20, 5/22
See application file for complete search history.

(56) References Cited

U.S. PATENT DOCUMENTS

| | | | |
|---|---|---|---|
| 2,524,232 A | 10/1950 | Onsrud | |
| 2,598,581 A * | 5/1952 | McKenna et al. | 407/104 |
| 2,678,487 A | 5/1954 | Onsrud | |
| 3,163,920 A | 1/1965 | Stier | |
| 3,341,191 A * | 9/1967 | Pianowski | 204/297.13 |
| 3,341,919 A * | 9/1967 | Herbert | 407/104 |
| 3,354,526 A * | 11/1967 | Erkfritz | 407/40 |
| 3,662,444 A * | 5/1972 | Erkfritz | 407/41 |
| 3,740,807 A * | 6/1973 | Getts | 407/104 |
| 3,913,197 A * | 10/1975 | Wolf | 407/47 |

(Continued)

FOREIGN PATENT DOCUMENTS

EP 1197281 4/2002

OTHER PUBLICATIONS http://www.school-for-champions.com/science/frictioncoeff.htm (website updated on Feb. 10, 2002 per archive.org).*

Primary Examiner—Monica Carter
Assistant Examiner—Sara Addisu
(74) Attorney, Agent, or Firm—Larry R. Meenan

(57) ABSTRACT

An insert retention screw has a head with a radius that is a sufficient size to fit within a mounting hole of a cutting insert and seat within a seating plane within the mounting hole that is generally perpendicular to the axis of the insert when the screw is at an angle in a range of about 0–15 degrees. The retention screw is provided for holding a cutting insert in the pocket of a tool body. The pocket is partially defined by a floor and a seating surface. A threaded hole is at an angle that is taken with reference to the pocket floor. The insert has a mounting hole passing therethrough. The retention screw passes through the mounting hole and threads into the threaded hole so as to draw the insert against the seating surface. Orienting the insert retention screw at an angle is accomplished by selecting a tool body and a cutting insert, determining the frictional force between the tool body and cutting insert, and determining an angle for the retention screw, wherein a force component of the retention screw is greater than or equal to the frictional force between the tool body and the cutting insert.

11 Claims, 9 Drawing Sheets

U.S. PATENT DOCUMENTS

| | | |
|---|---|---|
| 4,072,438 A | 2/1978 | Powers |
| 4,397,592 A * | 8/1983 | Erickson ................... 407/105 |
| 4,427,322 A * | 1/1984 | Kroll ......................... 407/105 |
| 4,430,031 A * | 2/1984 | Hellstrom .................. 407/104 |
| 4,648,755 A | 3/1987 | Stashko |
| 4,681,485 A | 7/1987 | Koelewijn |
| 4,709,737 A | 12/1987 | Jonsson |
| 4,808,045 A | 2/1989 | Tsujimura et al. |
| 4,848,979 A * | 7/1989 | Simmons .................... 407/103 |
| 4,940,369 A | 7/1990 | Aebi et al. |
| 5,039,259 A | 8/1991 | Duncan |
| 5,071,292 A | 12/1991 | Satran |
| 5,092,718 A | 3/1992 | Shallenberger |
| 5,199,828 A * | 4/1993 | Forsberg et al. ............ 407/104 |
| 5,513,931 A * | 5/1996 | Reiterman et al. .......... 407/113 |
| 5,586,843 A | 12/1996 | Minicozzi |
| 5,593,255 A | 1/1997 | Satran et al. |
| 5,688,083 A | 11/1997 | Boianjiu |
| 5,692,860 A | 12/1997 | Kramer |
| 5,772,364 A | 6/1998 | Satran et al. |
| 5,800,100 A * | 9/1998 | Krenzer ...................... 408/224 |
| 5,853,267 A | 12/1998 | Satran et al. |
| 5,871,309 A | 2/1999 | Svensson |
| 6,053,671 A | 4/2000 | Stedt et al. |
| 6,190,095 B1 | 2/2001 | Schmidt |
| 6,257,807 B1 | 7/2001 | Heinloth |
| 6,293,737 B1 * | 9/2001 | Satran et al. ............... 407/113 |
| 6,503,028 B1 | 1/2003 | Wallström |
| 6,536,998 B1 | 3/2003 | Satran et al. |
| 6,579,042 B1 * | 6/2003 | Shiraiwa ..................... 407/35 |
| 6,761,514 B1 * | 7/2004 | Cirino ........................ 408/203.5 |
| 2003/0170079 A1 | 9/2003 | Daiguji et al. |
| 2004/0028491 A1 * | 2/2004 | Fritsch et al. ............... 408/227 |
| 2004/0071515 A1 * | 4/2004 | Arvidsson et al. .......... 407/113 |
| 2004/0101371 A1 * | 5/2004 | Arvidsson et al. .......... 407/48 |
| 2004/0101384 A1 * | 5/2004 | Schilling et al. ............ 411/537 |
| 2004/0223816 A1 * | 11/2004 | Sheffler et al. |

* cited by examiner

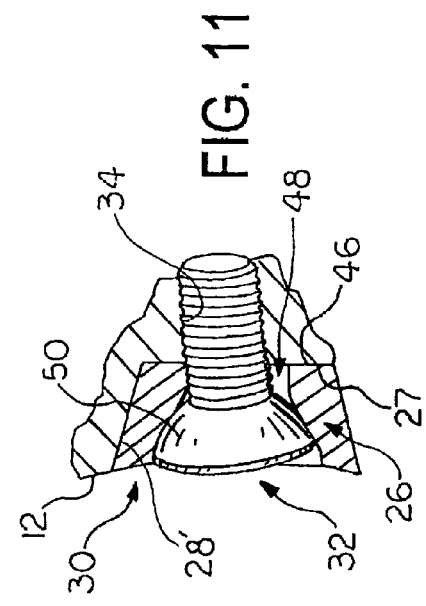
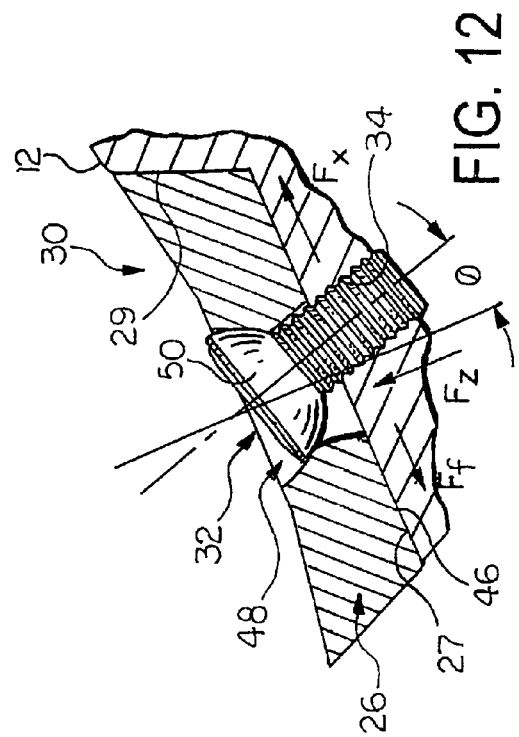
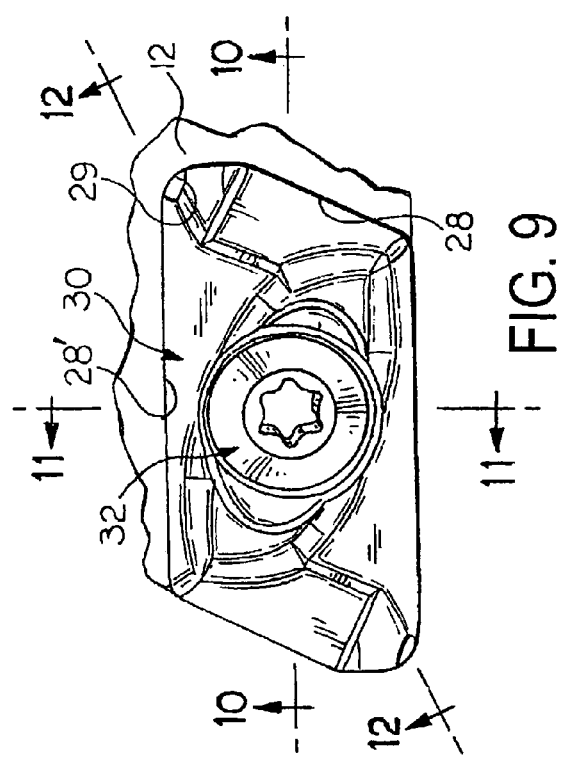
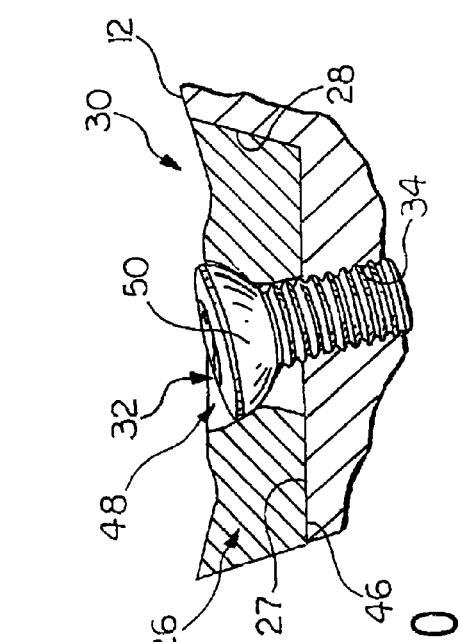

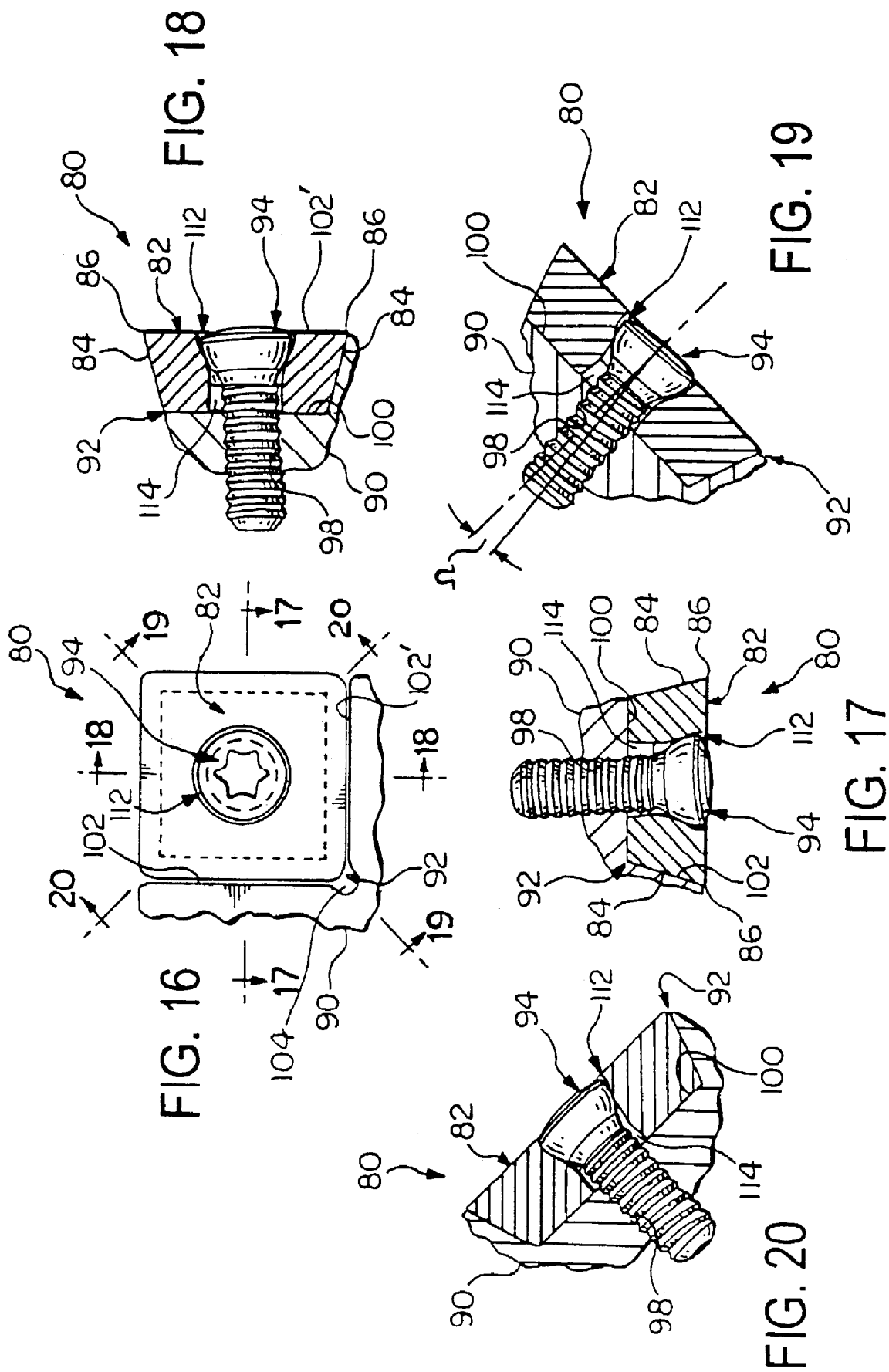

INSERT RETENTION SCREW AND TOOL BODY AND INSERT THEREWITH

FIELD OF THE INVENTION

The present invention relates to an insert retention screw for holding a cutting insert in the pocket of a tool body and that resists binding with the insert during a cutting operation. The screw can be oriented to match the lubricity coefficient of the insert and the tool body and thus allow the insert to slide into the apex of seating surfaces in a pocket of the tool body.

BACKGROUND OF THE INVENTION

Cutting tools are well known. A conventional cutting tool typically comprises a tool body that is adapted to mate with a cutting machine. The tool body has a working end and one or more pockets in the working end. A conventional pocket ordinarily includes floor and two seating surfaces, which intersect one another at an apex. The pockets are provided for receiving cutting inserts. A retention screw passes through a mounting hole in each insert and is threaded into a threaded hole in the floor of a corresponding pocket.

A conventional threaded hole is generally perpendicular to the floor of the pocket. As a result, the retention screw is vulnerable to a shear force, which renders the retention screw prone to breaking. The perpendicular orientation of the retention screw is also not the most suitable orientation for the screw because the screw, in this orientation, does not direct the insert toward the seating surfaces effectively. It is desirable to provide a seating arrangement that overcomes these deficiencies.

A conventional cutting insert typically has a top rake face, flank faces, and a cutting edge between the rake and flank faces. An inboard rake face extends radially inward from the flank face of the cutting insert. A ramp edge is provided between an inboard flank face and the rake face. The cutting edge is generally parallel to the bottom of the insert. The ramp edge has a negative geometry. The parallel orientation of the cutting edge and the negative geometry of the ramp edge are not the most suitable characteristics for a cutting insert. These characteristics typically require greater force to cut the workpiece, affecting the ramping angle that can be achieved by the cutting insert, and producing an inferior finish. Consequently, greater efforts and extended cutting operations are required. Moreover, additional independent cutting operations are required to achieve a desired finish. To this end, it is desirable to provide an insert that would achieve greater ramping angles, require less force, and achieve a desired finish in fewer cutting operations.

A conventional tool body has radial and axial surfaces adjacent the pockets. These surfaces may engage the workpiece during cutting operations, especially when performing ramping (i.e., the cutting tool moves axially and radially) or helical interpolation (i.e., the cutting tool moves axially and radially in a helical direction) operations. This surface engagement adversely affects the finish produced by the conventional cutting tool. It is desirable to provide a tool body that has sufficient clearance between the radial and axial surfaces and the workpiece during cutting operations to produce a desirable finish and thus reduce or eliminate the need for additional cutting operations.

During a cutting operation, the temperature of the cutting tool is elevated due to the frictional engagement of the cutting tool and the workpiece. A conventional retention screw can bind with the cutting insert due to the elevated temperature of the cutting tool. As a consequence, the retention screw and thus the cutting insert cannot be readily removed. This is a deficiency with a conventional retention screw. What is needed is a retention screw that is less likely to bind with an insert than a conventional retention screw.

Some conventional tool bodies have flutes for evacuating chips from the workpiece during a cutting operation. The flutes are defined by sidewalls, which are cut into the tool body. The flutes typically originate from the cutting insert and extend in an axial direction away from the working end of the tool body. The transition between the cutting insert and the flute is generally discontinuous and thus obstructs the flow of chips through the flute. What is needed is a cutting tool that has a continuous or smooth transition between the insert and the flute and thus effectively discharges chips from the working end of the cutting tool.

SUMMARY OF THE INVENTION

Generally speaking, the invention is directed to an insert retention screw comprising a head with a radius. The radius is a sufficient size to fit within a mounting hole of a cutting insert and seat within a seating plane within the mounting hole, wherein the seating plane is generally perpendicular to the axis of the mounting hole when the screw is at an angle in a range of about 0–15 relative to the axis of the mounting hole.

The invention is further directed to a cutting tool comprising a tool body having a pocket, an insert, and a retention screw holding the insert in the pocket. The pocket is partially defined by a floor and a seating surface. A threaded hole is in the pocket. The threaded hole is at an angle that is taken with reference to the pocket floor. The insert has an upper rake face, at least one side defining a flank face, a cutting edge provided between the rake face and the flank face, and a mounting hole passing therethrough. The retention screw passes through the mounting hole and threads into the threaded hole in the floor of the pocket so as to draw the insert against the seating surface.

The invention is still further directed to a method for orienting an insert retention screw at an angle. The method comprises the steps of selecting a tool body and a cutting insert, determining the frictional force between the tool body and cutting insert, and determining the angle for the retention screw, wherein a force component of the retention screw is greater than or equal to the frictional force between the tool body and the cutting insert.

BRIEF DESCRIPTION OF THE DRAWINGS

Further features of the present invention, as well as the advantages derived therefrom, will become clear from the following detailed description made with reference to the drawings in which:

FIG. 9 is a plan view of the cutting insert and angled retention screw according to a preferred embodiment of the invention;

FIG. 10 is a cross-sectional view of the cutting insert and angled retention screw taken along the line 10—10 in FIG. 9;

FIG. 11 is a cross-sectional view of the cutting insert and angled retention screw taken along the line 11—11 in FIG. 9;

FIG. 12 is a cross-sectional view of the cutting insert and angled retention screw taken along the line 12—12 in FIG. 9;

FIG. 16 is a partial side elevational view of an alternative cutting tool;

FIG. 17 is a cross-sectional view taken along the line 17—17 in FIG. 16;

FIG. 18 is a cross-sectional view taken along the line 18—18 in FIG. 16;

FIG. 19 is a cross-sectional view taken along the line 19—19 in FIG. 16;

FIG. 20 is a cross-sectional view taken along the line 20—20 in FIG. 16;

DETAILED DESCRIPTION OF THE INVENTION

Figure 1:
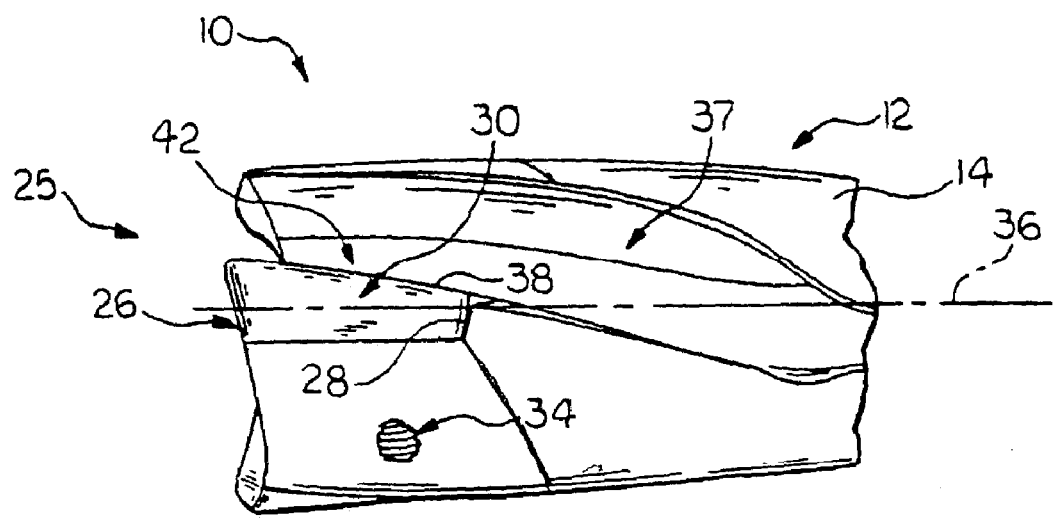
FIG. 1 is a partial side elevational view of a cutting tool according to a preferred embodiment of the invention.

With reference now to the drawings, wherein like numerals designate like components throughout all of the several figures, there is illustrated in FIG. 1 a cutting tool 10 according to a preferred embodiment of the invention. The cutting tool 10 is adapted for use in face milling (i.e., the cutting edge is on the face of the tool), peripheral milling (i.e., the cutting edge is on the periphery of the tool), ramp milling, and/or helical interpolation operations. Multiple cutting tools typically perform these machining operations. Since the cutting tool 10 according to the instant invention is capable of performing any one or all these machining operations, it requires less machining time.

The cutting tool 10 comprises a holder, such as the tool body 12 shown. The tool body 12 preferably has a generally cylindrical outer peripheral surface 14, a portion of which defines a shank (not shown) that is adapted to mate with an adaptor of a type well known in the art to adapt the tool to a machining center or cutting machine (not shown).

Figure 2:
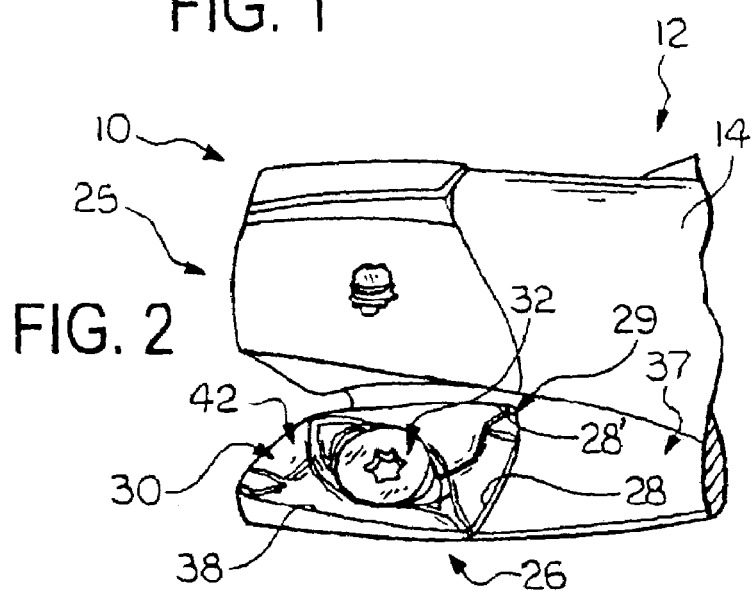
FIG. 2 is a side elevational view of the working end of the cutting tool illustrated in FIG. 1 rotated approximately 90 degrees.
Figure 3:
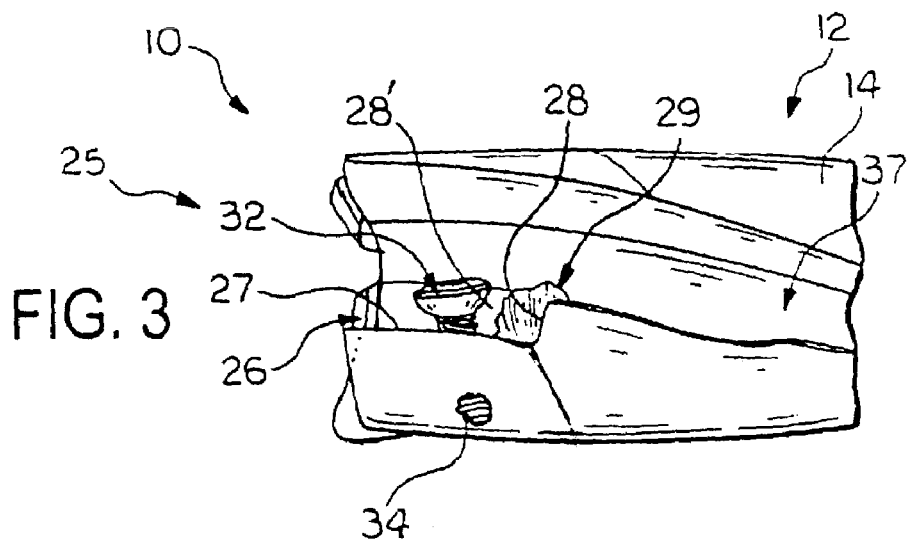
FIG. 3 is a side elevational view of the cutting tool shown in FIG. 1 with a cutting insert removed from the tool body pocket.

The cutting tool 10 according to the present invention comprises a tool body 12 that has a cutting or working end, generally indicated at 25 (i.e., to the left when viewing FIG. 1), with one or more pockets 26 therein, as clearly shown in FIG. 3. The pockets 26 are adapted to receive cutting inserts 30. The cutting inserts 30 can be in any suitable form and are preferably indexable to aid in positioning and repositioning the cutting inserts 30 in the pockets 26. The cutting inserts 30 are held within the pockets 26 by hold-down or retention screws 32 (shown in FIG. 2). The retention screws 32 are adapted to be inserted through the cutting inserts 30 and threaded into holes 34 that extend transversely relative to the longitudinal axis 36 (shown in FIG. 1) of the tool body 12. The tool body 12 and the inserts 30 cooperatively define flutes 37 for evacuating chips from a workpiece (not shown).

As illustrated in FIG. 3, the pockets 26 are preferably defined, at least in part, by a radially extending floor 27 and at least two sidewalls or seating surfaces (i.e., the radial and axial walls 28, 28'). These surfaces 28, 28' extend from the pocket floor 27 and intersect one another at an apex, which is clearly illustrated at 29 in FIG. 3. In the illustrated embodiment, three pockets 26 are provided for supporting three cutting inserts 30 that cooperatively form three corresponding flutes 37 in the tool body 12. However, those of ordinary skill in the art should appreciate that one or more pockets, inserts, and flutes can be used to carry out the invention.

A cutting insert 30 according to the preferred embodiment of the invention is illustrated in FIGS. 4–8. As shown in the drawings, an elliptical cutting edge 38 with a wiper facet 39 is designed into a front edge of the cutting insert 30. The elliptical cutting edge 38 has a radius that graduates or diminishes, instead of being constant, from the nose 40 of the cutting insert 30 to the trailing end (i.e., opposite the nose 40) of the cutting edge 38. The specific radius of the cutting edge 38 is measured from an imaginary focal point and can be, for example, in a range of about 0.500–25 inches. The radius obviously depends on the size of the cutting tool. The cutting edge 38 is preferably tangential to the radius of the nose 40 and the inboard ramping cutting edge 41 of the cutting insert 30. This produces an exceptional surface finish on both the face and sidewall of the workpiece (not shown) when operated under certain parameters. For example, the wiper facet 39 may be about 0.08 inches wide and the radius of the cutting edge 38 may be about two inches. When the cutting tool 10 is operated at a feed rate per revolution (i.e., about 0.08 inches per revolution) that is within the width of the wiper facet 39, an exceptional surface finish can be produced. The radius of the cutting edge 38 is based on the orientation of the cutting insert 30 in the tool body 12 and the aggregate diameter of the cutting tool 10 with the cutting inserts 30 therein (as depicted in the end view in FIG. 13). A radius is determined between various compensation requirements (i.e., the orientation of the pocket to the face of the workpiece) that will allow the cutting insert 30 to produce a shoulder that is about 90 degrees and manufacturing tolerances that can be held to do so.

Figure 4:
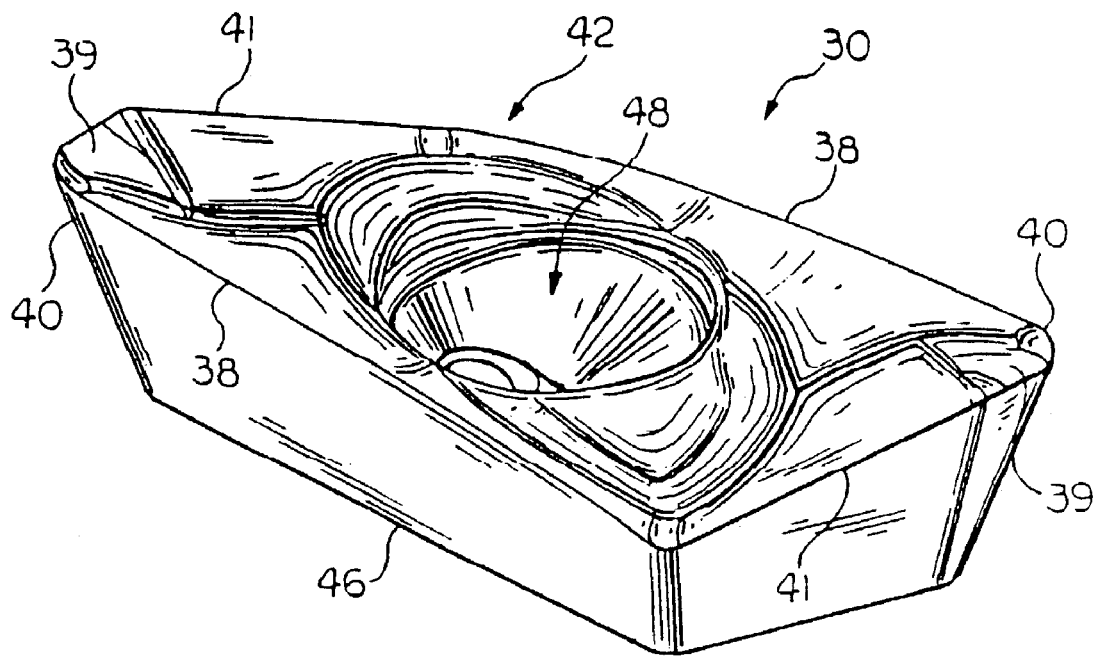
FIG. 4 is an enlarged-scale perspective view of a cutting insert according to a preferred embodiment of the invention.
Figure 5:
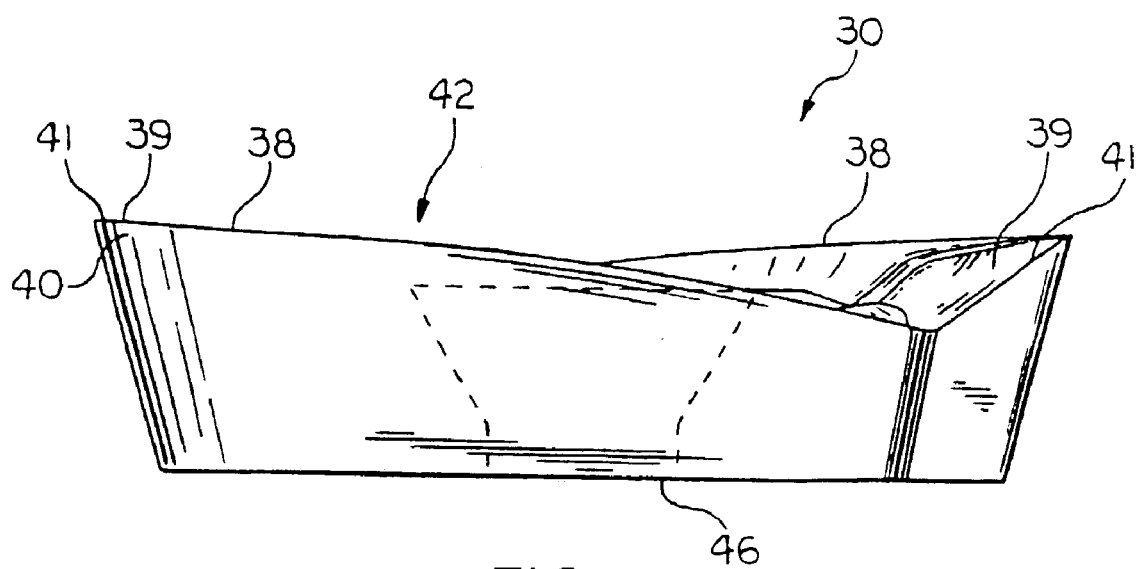
FIG. 5 is a front elevational view thereof with the rear being a mirror image thereof.
Figure 6:
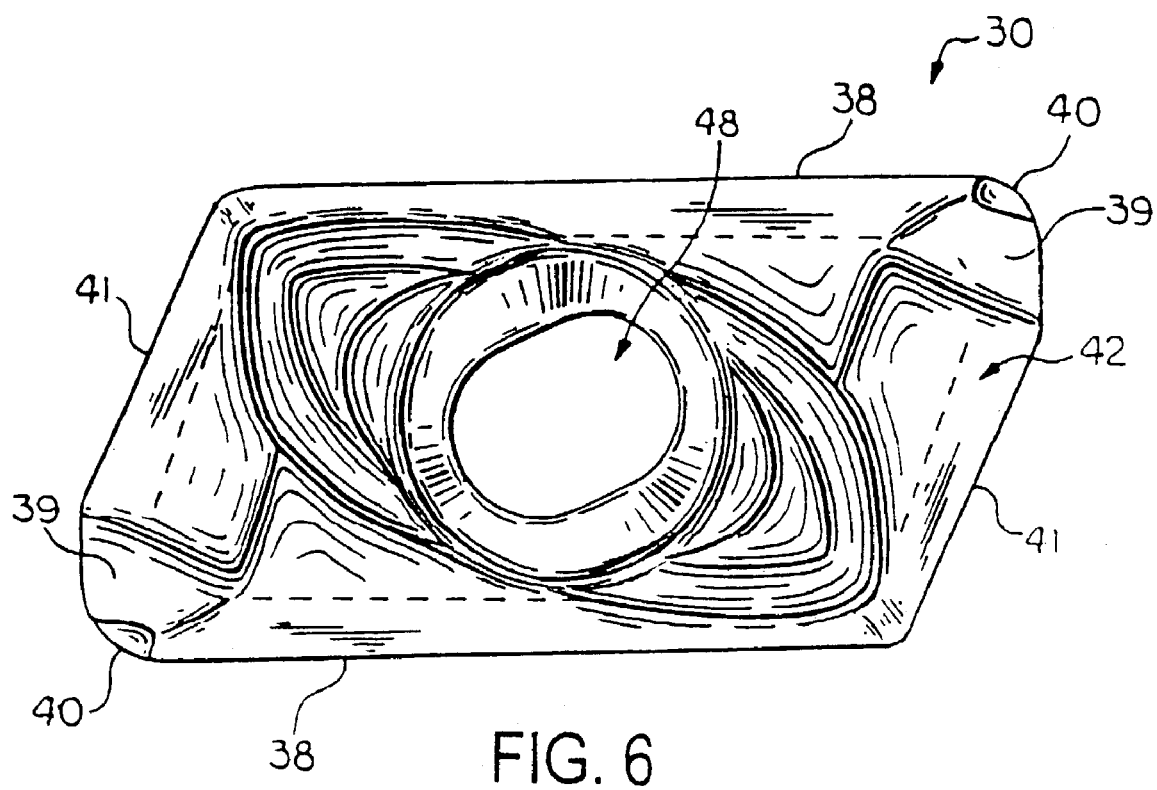
FIG. 6 is a top plan view thereof.
Figure 7:
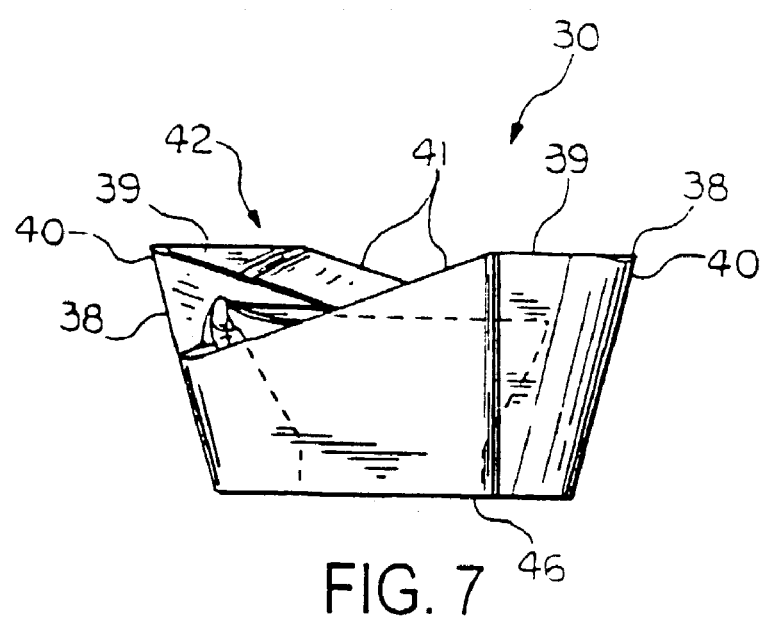
FIG. 7 is a right side elevational view thereof with the left side being a mirror image thereof.
Figure 8:
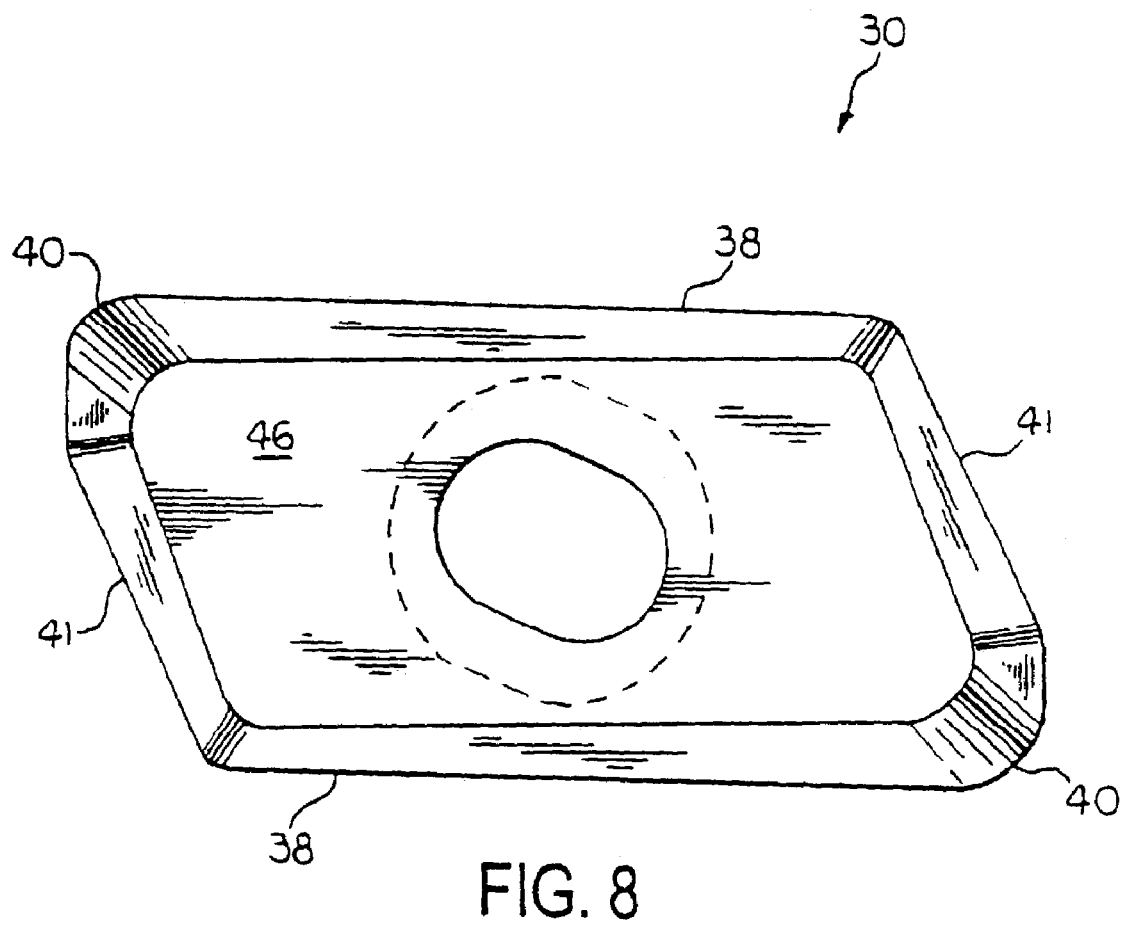
FIG. 8 is a bottom plan view thereof.

The elliptical cutting edge 38 of the insert 30 is preferably elliptical to contribute to a positive cutting geometry (i.e., raised geometry) on the rake face 42 of the insert 30 (i.e., the top surface when viewing FIGS. 4 and 5). The positive cutting geometry of the rake face 42 requires less cutting force than conventional cutting inserts. Moreover, the elliptical cutting edge 38 produces a truer 90 degree shoulder on the workpiece (not shown), much like that produced by a conventional solid carbide end mill. The elliptical cutting edge 38 produces a final finish, thus reducing or eliminating the need for additional finishing operations by additional cutting tools.

The cutting insert 30 further has three-dimensional capabilities. That is to say, the inboard ramping cutting edge 41, which increases ramping capabilities (i.e., due to a positive geometry of the ramping edge 41) when compared to conventional inserts. The term "ramping" refers to a cutting operation wherein the insert is moved both axially and radially relative to the workpiece (not shown). The ramping edge 41 is normally parallel to the flat bottom of a conventional insert, resulting in a negative geometry, which requires greater cutting forces. Unlike a conventional ramping edge, the ramping edge 41 of the present invention has a positive geometry (i.e., the ramping edge 41 is raised relative to the rake face 42), which reduces cutting forces, as compared to the cutting forces required by the negative geometry of conventional inserts. The inboard ramping edge 41 additionally allows the cutting tool 10 to perform true ramping operations and helical interpolating operations at a much higher rate with machines, such as routers and shell mill cutters (not shown), which are not normally capable of performing ramping and helical interpolating operations. A "helical interpolating operation" is a cutting operation wherein the insert 30 moves axially and radially relative to the workpiece. The insert 30 begins by first cutting the periphery of a hole in the workpiece (not shown). Then, the insert 30 is moved in a helical pattern to the center of the hole while continuing in a direction of the axis of the hole until a required depth is achieved. This operation is generally performed without interruption.

As clearly illustrated in FIGS. 9–12, the attitude of the retention screws 32 and the holes 34 in the tool body 12 are at a non-perpendicular axial angle to an insert mounting hole 48, which will be described in greater detail hereinbelow, or the pocket floor 27. This permits proper seating of the cutting insert 30 without placing added stresses on the retention screw 32. That is to say, the attitude of the screw 32 allows the screw 32 to be in a tension orientation rather than a shear orientation. Consequently, the screw 32 is utilized in its strongest orientation.

The attitude of the retention screws 32 can be at a compound angle to the bottom 46 of the cutting insert 30 or the pocket floor 27. This angle can be calculated to match the lubricity coefficient (i.e., coefficient of friction) of the insert 30 and the tool body 12. This allows the insert 30 to slide into the apex 29 (shown in FIG. 12) of the seating surfaces 28, 28' (shown in FIG. 12) and thus prevents any additional stresses to the screw 32. For example, for a given screw force $F_{SCREW}$, the following are known:

$$F_z = F_{SCREW} \cos \Theta,$$

$$F_f = C_f F_{SCREW} \cos \Theta, \text{ and}$$

$$F_x = F_{SCREW} \sin \Theta,$$

wherein $F_z$ is the force component in a direction perpendicular to the pocket floor 27, $F_f$ is the frictional force, and $F_x$ is the force component in a direction parallel to the pocket floor 27. These forces $F_z$, $F_f$, and $F_x$ are all depicted in FIG. 12. The force component $F_x$ must be sufficient to overcome the frictional force $F_f$. At what angle $\Theta$ is the force component $F_x$ greater than or equal to the frictional force $F_f$ or at what angle $\Theta$ does $F_f = F_x$ @ $C_f$?

$$F_f = F_x \text{ or } C_f F_{SCREW} \cos \Theta = F_{SCREW} \sin \Theta$$

$$C_f = \tan \Theta$$

$$\Theta = \tan^{-1} C_f$$

If the coefficient of friction $C_f$ is 0.5, which is the coefficient of friction of uncoated carbide on uncoated steel, then angle $\Theta$ is 26.56 degrees. If the coefficient of friction $C_f$ is 0.2, which is the coefficient of friction of uncoated carbide on uncoated carbide, the angle $\Theta$ is 11.3 degrees. If the coefficient of friction $C_f$ is 0.27, which is the coefficient of friction of oxide film applied steel on steel, the angle $\Theta$ is 15.1 degrees.

Hence, the foregoing may be summarized by selecting material compositions of the tool body 12 and the cutting insert 30, determining the coefficient of friction of the materials, and determining an angle for the retention screw 32, wherein the force component $F_x$ parallel to the pocket floor 27 is greater than or equal to the frictional force $F_f$ between the materials. The force component $F_x$ parallel to the pocket floor 27 may be oriented toward either seating surface 28, 28' or the apex 29 therebetween to draw the insert 30 toward a seating surface 28, 28' or the apex 29.

The coefficient of friction for materials may be affected by the environment (i.e., temperature) or foreign substances (i.e., lubricants). These factors may be considered when determining a desired angle. Also, external forces (i.e., dynamic forces) encountered during a cutting operation may be considered. It may be desirable to angle the retention screw 32 to compensate for the effects of such forces.

The angled orientation of the screw 32 also permits an increase in steel under the bottom 46 of the insert 30 for added support and permits the retention screw 32 to have increased thread engagement on smaller diameter tool bodies. Insufficient thread engagement is a known flaw of retention screws that are oriented perpendicularly to the bottom of the insert.

It should be noted upon viewing FIGS. 10 and 11 that the retention screw 32 is angled relative to both the radial and axial walls 28, 28'. This angular orientation slides the insert 30 toward the radial seating surface 28 (i.e., to the right when viewing FIG. 10) and toward the axial seating surface 28' (i.e., upward when viewing FIG. 11). It should be appreciated by one of ordinary skill in the art that this effectively slides the insert 30 into the apex 29 (i.e., to the right when viewing FIG. 12) between the seating surfaces 28, 28'.

Referring back to FIG. 6, there is illustrated an angular mounting hole 48 for the retention screw 32 (shown in FIGS. 9–12). The mounting hole 48 passes through the center of the cutting insert 30. It should be noted that the mounting hole 48 is oblong and oriented with the greater length of the mounting hole 48 extending between the opposing noses 40 of the insert 30. The mounting hole 48 is arranged and configured to guide the retention screw 32 into the threaded hole 34 (clearly illustrated in FIGS. 10–12) in the tool body 12. The mounting hole 48 is oblong because the illustrated embodiment is indexable. That is to say, the insert can be removed from the pocket 26 (also shown in FIGS. 10–12), rotated 180 degrees (i.e., clockwise or counter-clockwise when viewing FIG. 6), and reinserted into the pocket 26.

It should be further noted that the retention screw 32 according to a preferred embodiment of the invention has a spherical or radius head 50, as clearly illustrated in FIGS. 10–12. The mounting hole 48 through the insert 30 is preferably conical. It should be appreciated that the head 50 and the mounting hole 48 may be cooperatively sized and configured so that the head 50 has limited contact with the mounting hole 48. This limited contact reduces the risk of the retention screw 32 becoming bound to the insert 30. The contact could be limited to approximately 180-degree contact, which, in the drawings, occurs on the side of the mounting hole 48 closest to the apex 29 of the pocket 26 (i.e., between the seating surfaces 28, 28') as shown in FIG. 12. The limited contact may occur when force is applied to the retention screw 32 since the retention screw 32 contacts the side of the mounting hole 48 closest to the apex 29 of the pocket 26 and forces the cutting insert 30 toward the apex 29.

In operation, the tool body 12 is supported in an adapter of a type well known in the art to adapt the tool to the machining center or cutting machine (not shown). The insert 30 is secured in the pocket 26 with the angled retention screw 32, as set forth above. As the spindle turns, the insert 30 engages a workpiece (not shown) to remove material from the workpiece. As material is removed from the workpiece, chips are discharged through the flutes 37.

According to a preferred embodiment of the invention, the cutting insert 30 and the tool body 12 cooperatively form the flutes 37. As clearly FIGS. 1–3, the flutes 37 are defined by sidewalls, which are, for the most part, cut into the tool body 12. However, a small portion of the sidewalls is represented by the rake face 42 of the insert 30. It should be appreciated that there is a smooth transition between the portion of the sidewalls that is represented by the rake face 42 and the portion cut into the tool body 12. This smooth transition results in a continuous, or uninterrupted, and unobstructed gullet or flute for efficient and effective evacuation of chips from the workpiece.

The flutes 37 are also designed so that the elliptical, helical shape of the cutting edge 38 forms a continuous, level surface with the helical flute of the tool body 12. The flutes 37 provide helical-shaped chip gullets that encourage a natural chip flow from the working end 25 of the tool body 12. This further results in an unobstructed flow of chips from the cutting edge 38 of the insert 30 through the flutes 37.

According to a preferred embodiment of the invention, the bottom 46 of each flute 37 moves further away from the longitudinal axis 36 of the tool body 12 in a radial direction as the flute 37 extends toward the shank from the working end 25 of the tool body 12. This adds rigidity to the tool body 12 because the cross-sectional area of the tool body 12 between the flutes 37 becomes greater toward the shank.

Figure 13:
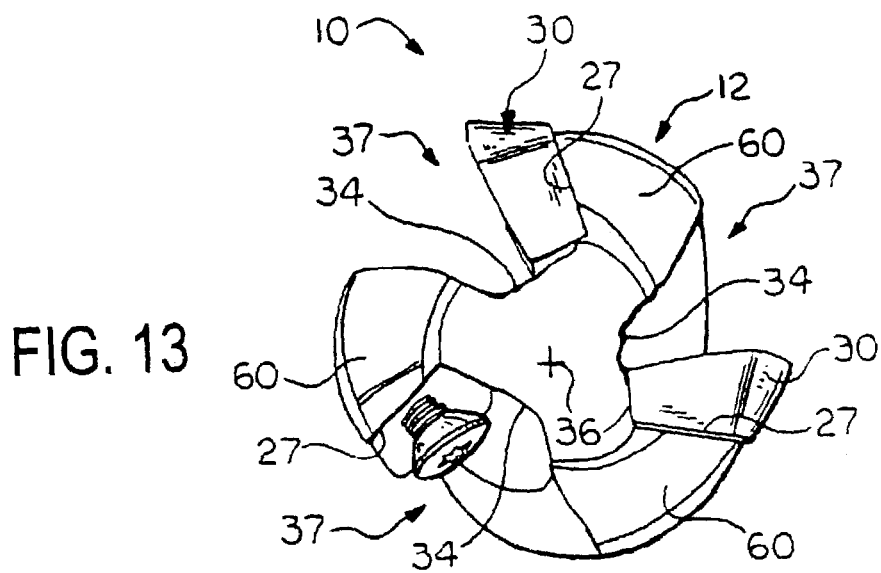
FIG. 13 is a front elevational view of a axial clearance face and a radial clearance face according to the present invention.
Figure 14:
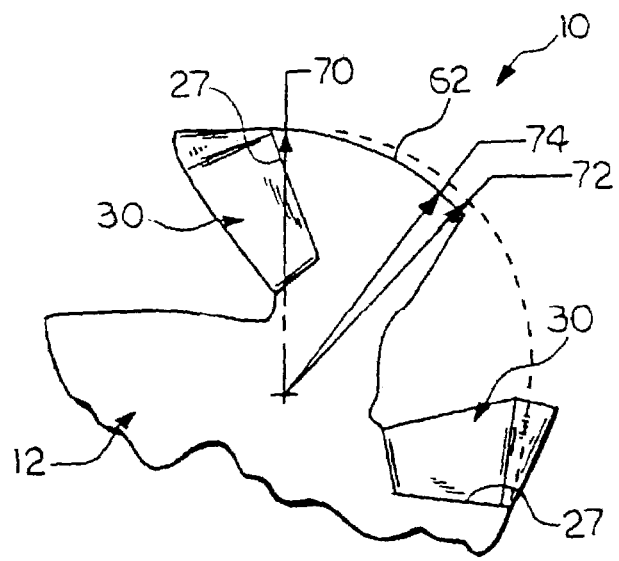
FIG. 14 is a front elevational view of the radial clearance face illustrated in FIG. 13.
Figure 15:
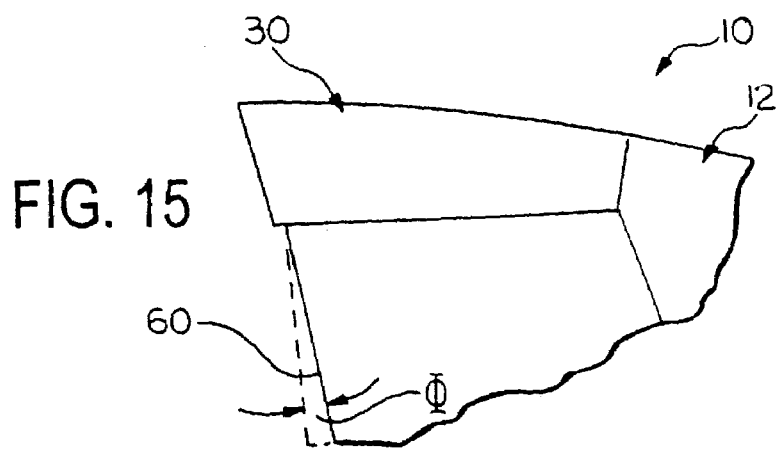
FIG. 15 is an enlarged-scale side elevational view of the axial clearance face illustrated in FIG. 13.
Figure 21:
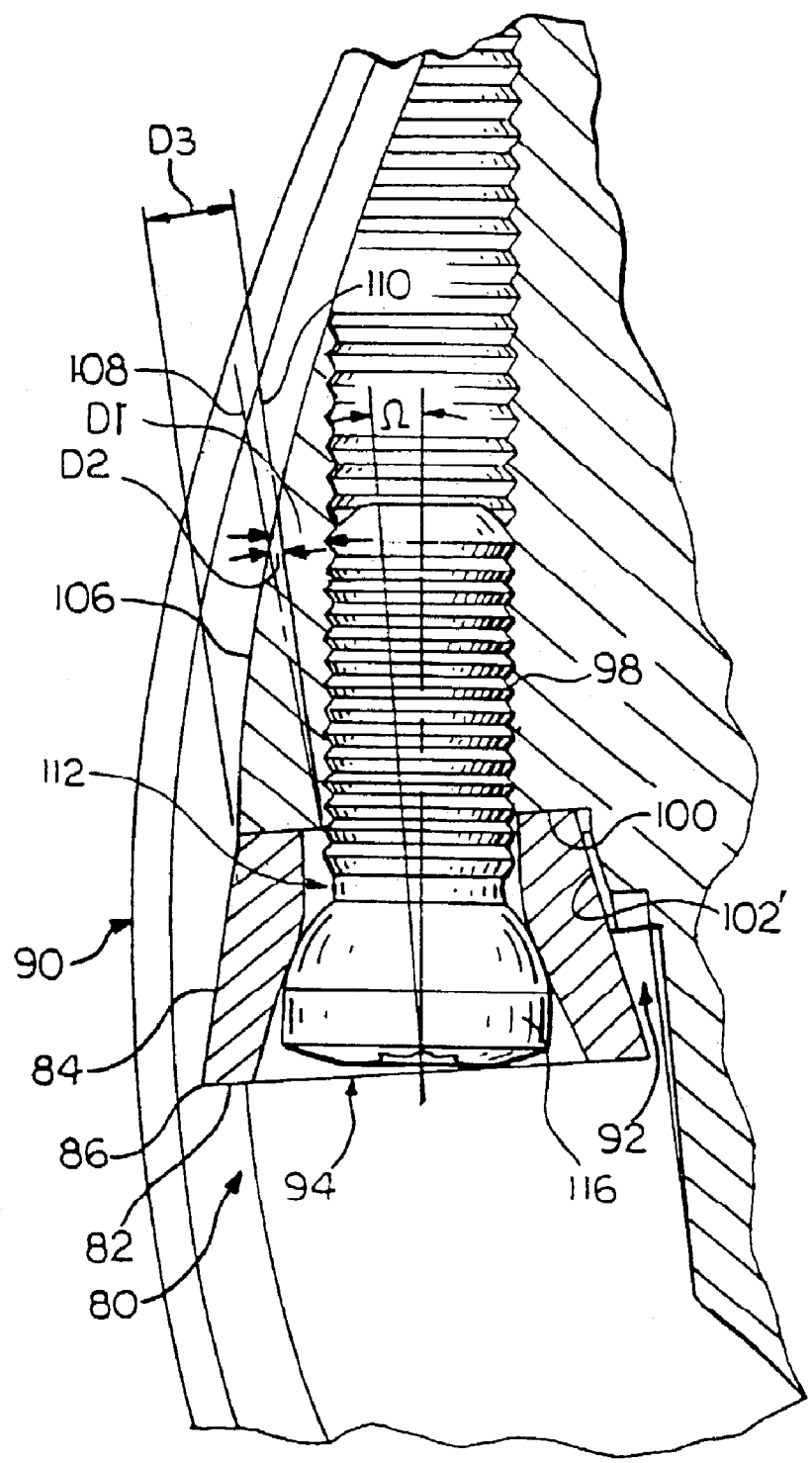
FIG. 21 is an enlarged partial schematic representation of the cutting tool illustrated in FIG. 16.

Conventional tool bodies have axial and radial surfaces that may engage the workpiece during cutting operations. The present invention has a face clearance or axial clearance face 60, as illustrated in FIG. 13 and a graduated radial clearance face 62, as illustrated in FIG. 14. The axial clearance face 60 is best described with reference to FIG. 15, wherein a conventional axial surface is illustrated in broken line. The conventional axial surface does not provide sufficient clearance for higher ramping angles during ramping or helical interpolating operations. The axial clearance face 60 of the present invention, by comparison, is preferably at an angle Φ in a range of about 5–25 degrees relative to that of a conventional axial clearance face or relative to a plane that is perpendicular to the longitudinal axis 36 (shown in FIG. 13) of the tool body 12. According to a preferred embodiment of the invention, the axial clearance face 60 is at an angle Φ in a range of about 8–10 degrees. Consequently, the cutting tool 10 according to the present invention has an increased ability to achieve higher ramp angles than a conventional tool body. It should be noted that the axial clearance face 60 coincides with the clearance face (i.e., to the left when viewing FIG. 15) of the insert 30. Alternatively, the axial clearance face 60 may be offset and generally parallel or at some angle greater than parallel to the clearance face of the insert 30.

Similarly, a conventional radial surface is illustrated in broken line in FIG. 14. The conventional radial surface does not provide sufficient clearance for higher feed rates during face milling or helical interpolating operations. This is a typical failure or deficiency of conventional cutting tools. Unlike conventional cutting tools, the radial clearance face 62 of the present invention allows the cutting tool 10 to achieve higher feed rates and thus overcomes this deficiency.

The increased clearance is achieved by tapering the diameter of the radial clearance face 62. For example, a first radial clearance face diameter is indicated at 70 in FIG. 14 and a second radial clearance face diameter is indicated at 72. This results in an additional clearance, indicated, for example, at 74. The additional clearance 74 is with reference to the peripheral or cylindrical surface 14 of the tool body 12 (shown in FIG. 1). The radial clearance face 62 has a diminishing radius that begins at the pocket floor 27. The beginning of the radial clearance face 62 generally coincides with the flank face on the front end of the insert 30. The clearance of the radial clearance face 62 is based on a lateral feed rate in a range of about 0.030–0.050 inches per tooth (0.762–1.27 mm per tooth). A nominal clearance is based on a feed rate of about 0.040 inches per tooth (1.016 mm per tooth), which provides the most clearance without losing support of the tool body 12 and safety of the cutting tool 10 itself.

An alternative insert 80 and retention screw 94 are illustrated in FIGS. 16–21. Note that the insert 80 has an upper rake face 82 and four sides, each of which may define a flank face 84 (shown in FIGS. 17 and 18). A cutting edge 86 (also shown in FIGS. 17 and 18) may be provided between the rake face 82 and each flank face 84 of the insert 80. Consequently, the insert 80 may be indexable.

The insert 80 is adapted to be mounted in the pocket 92 of a tool body 90 by a retention screw 94. The retention screw 94 is threaded into a threaded hole 98 in the floor 100 of the pocket 92. The threaded hole 98 is preferably at a compound angle Ω (illustrated in FIG. 19), which is taken with reference to a plane that is perpendicular to the pocket floor 100 and two seating surfaces 102, 102', or the apex 104 between the seating surfaces 102, 102'. In the illustrated embodiment, the compound angle Ω is about 5 degrees. This is a nominal angle. However, an angle in a range of about 0–15 degrees may be suitable for carrying out the present invention. The specific angle depends upon the insert geometry, the size and shape of the retention screw 94, and the coefficient of friction between the tool body 90 and the cutting insert 80. It should be appreciated that the angle Ω need not be a compound angle but instead may be an angle relative to either one of the seating surfaces 102, 102'.

As clearly shown in FIGS. 17–20, the bottom 114 of the mounting hole 112 through the cutting insert 80 may be tapered or conical to provide clearance for the angled retention screw 94. Alternatively, the bottom 114 of the mounting hole 112 may have another form of relief or otherwise have an increased diameter portion, which is neither tapered or conical, to provide clearance for the angled retention screw 94. As yet another alternative, the mounting hole 112, or the bottom 114 thereof, may be sufficiently large, without the provision of a relief, to provide the requisite clearance to receive the angled retention screw 94 regardless of the indexed orientation of the insert 80. The clearance permits the insert 80 to be indexed while the screw 94 is angled without regard to the indexed orientation of the insert 80.

It should be noted that the benefit of providing the angle Ω of the screw 94 increases the distance D1 between the bottom of the screw 94 and the cylindrical surface 106 of the tool body 90. This is clearly illustrated in FIG. 21. Compare this with the distance D2 between the bottom of a conventional screw and the cylindrical surface of the tool body, as indicated between the lines 108, 110. The distance D3 between the top of the screw 94 and the cylindrical surface 106 of the tool body 90 is also increased slightly. The increased distances provide more tool body material between the screw 94 and the cylindrical surface 106 and thus increases the strength of the tool body 90 to better hold the screw 94 and the insert 80. The increased distance further precludes or eliminates the risk of the screw 94 protruding from the tool body 90 and/or allows a longer screw to be used. Longer screws have added strength.

Figure 22:
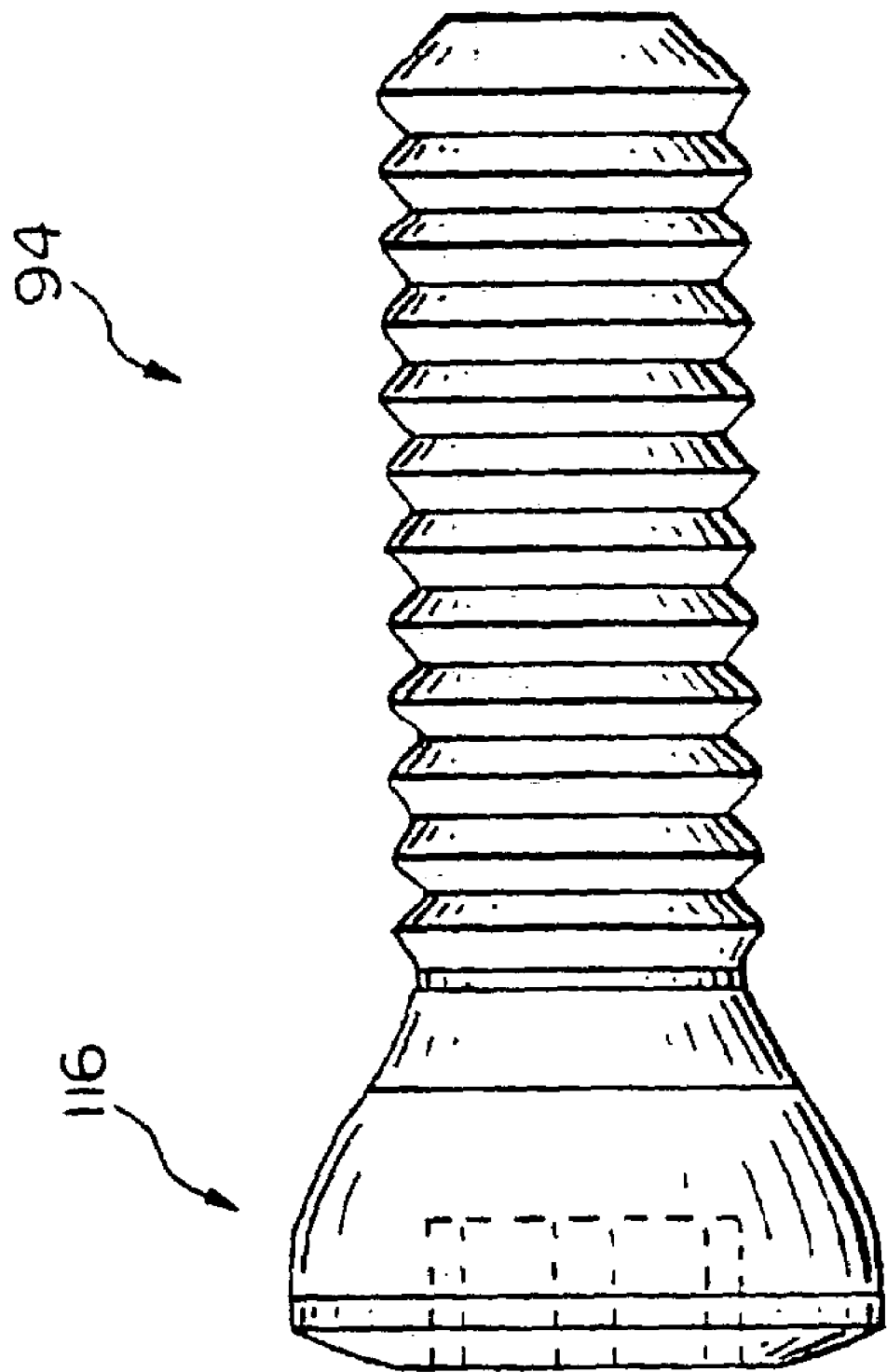
FIG. 22 is a side elevational view of the retention screw of the cutting tool illustrated in FIG. 16.

As illustrated in FIG. 22, the screw 94 has a spherical or radius head 116, similar to that of the screw 30 described above. The radius head 116 permits the screw 94 to properly seat in the mounting hole 112 (shown in FIG. 21), especially conventional mounting holes that are sized to comport with ISO or other industry standards. This is advantageous because a conventional retention screw (i.e., one that has a tapered or conical screw head), if oriented at an angle other than zero degrees, could contact a conventional mounting hole only on one side of the screw head, close to the top of screw 94. An opposing side would then protrude from the mounting hole 112. The radius head 116 is a sufficient size that still fits within the mounting hole 112 and seats within the proper seating plane within the hole 112. The proper seating plane is in a plane that is generally perpendicular to the axis of the insert 80, the mounting hole 112, or the floor 100 of the pocket 92 (shown in FIG. 21) and not necessarily perpendicular to the axis of screw 94. The screw 94 does not protrude from the mounting hole 112. Locating the radius of the head 116 depends on where lock-up (i.e., locking engagement of the screw 94 and mounting hole 112) is desired. If the screw 94 is too far out of the mounting hole 112 or too far in the mounting hole 112, then the insert 80 may not seat properly in the pocket 92.

It should be appreciated that various features of the invention are adapted for use together or independent of one another. For example, the threaded holes 34 and the clearance faces 60, 62 of the tool body 12 are believed to be novel and adapted for use independent of one another. Moreover, the tool body 12 is adapted for use with either insert 30, 80 describe herein as well as other inserts, which are not described herein. The elliptical cutting edge 38, the inboard ramping cutting edge 41, and the angular mounting hole 48, among other features, of the insert 30, described herein, are believed to be independently novel features that are not intended to be limited to the particular insert 30 shown and described herein. Further, the retention screws 32, 94 are interchangeable with the various embodiments described herein and are adapted for use with other cutting tools. The orientation of the screw and the method of determining the orientation are not intended to be limited to the tool bodies 12, 90, the inserts 30, 80, and the screws 32, 94 shown or described herein but may be practiced with other tool bodies, insert, and screws.

The cutting tool according to the present invention has several advantages. The tool has improved performance in providing surface finish. The tool has improved three-dimensional capabilities. The tool produces true perpendicular wall surfaces when making single or multiple passes on peripheral cuts. The tool provides improved insert retention. Moreover, the tool body provides increased support and clearances.

While the invention has been described with respect to several preferred embodiments, various modifications and additions will become apparent to persons of ordinary skill in the art. All such modifications and additions are intended to be encompassed within the scope of this patent, which is limited only by the claims appended hereto.

What is claimed is:

1. A cutting tool for use in cutting machine operations, the tool comprising:
   a tool body having a pocket, partially defined by a floor and a first seating surface, and a threaded hole in the pocket, the threaded hole being at an angle that is taken with reference to the pocket floor;
   an insert in the pocket, the insert having an upper rake face, at least one side defining a flank face, a cutting edge provided between the rake face and the flank face, and a mounting hole passing therethrough; and
   a retention screw passing through the mounting hole and threading into the threaded hole in the floor of the pocket so as to draw the insert against the first seating surface,
   wherein the retention screw contacts the mounting hole in a seating plane such that contact between the screw and the mounting hole is limited to approximately 180-degrees or less, and
   wherein the tool body has a peripheral surface defining a radial clearance face having a diminishing radius that begins at the pocket floor at a point that generally coincides with the flank face of the insert.

2. The cutting tool of claim 1, wherein the pocket is further defined by a second seating surface intersecting the first seating surface at an apex, the retention screw threading into the mounting hole so as to draw the insert against the first and second seating surfaces and against the apex therebetween.

3. The cutting tool of claim 1, wherein the threaded hole is oriented at an angle relative to the pocket floor.

4. The cutting tool of claim 1, wherein the retention screw has threads that extend circumferentially and completely engage the threaded hole.

5. The cutting tool of claim 1, wherein the retention screw has a head that makes limited contact with the mounting hole.

6. The cutting tool of claim 1, wherein the tool body and the insert have shapes that cooperatively form an uninterrupted flute.

7. The cutting tool of claim 6, wherein the cutting edge is elliptical and the flute continues from the elliptical cutting edge.

8. The cutting tool of claim 6, wherein the flute has a graduated depth.

9. The cutting tool of claim 1, further comprising a ramping cutting edge inboard with respect to the tool body.

10. The cutting tool of claim 1, wherein the rake face has a positive cutting geometry.

11. The cutting tool of claim 1, wherein the tool body further has an axial clearance face.

* * * * *